July 28, 1953  E. E. RHODES ET AL  2,646,649
STRUCTURE AND METHOD FOR CLEANING WELDING RODS
Filed Feb. 4, 1952  2 Sheets-Sheet 1
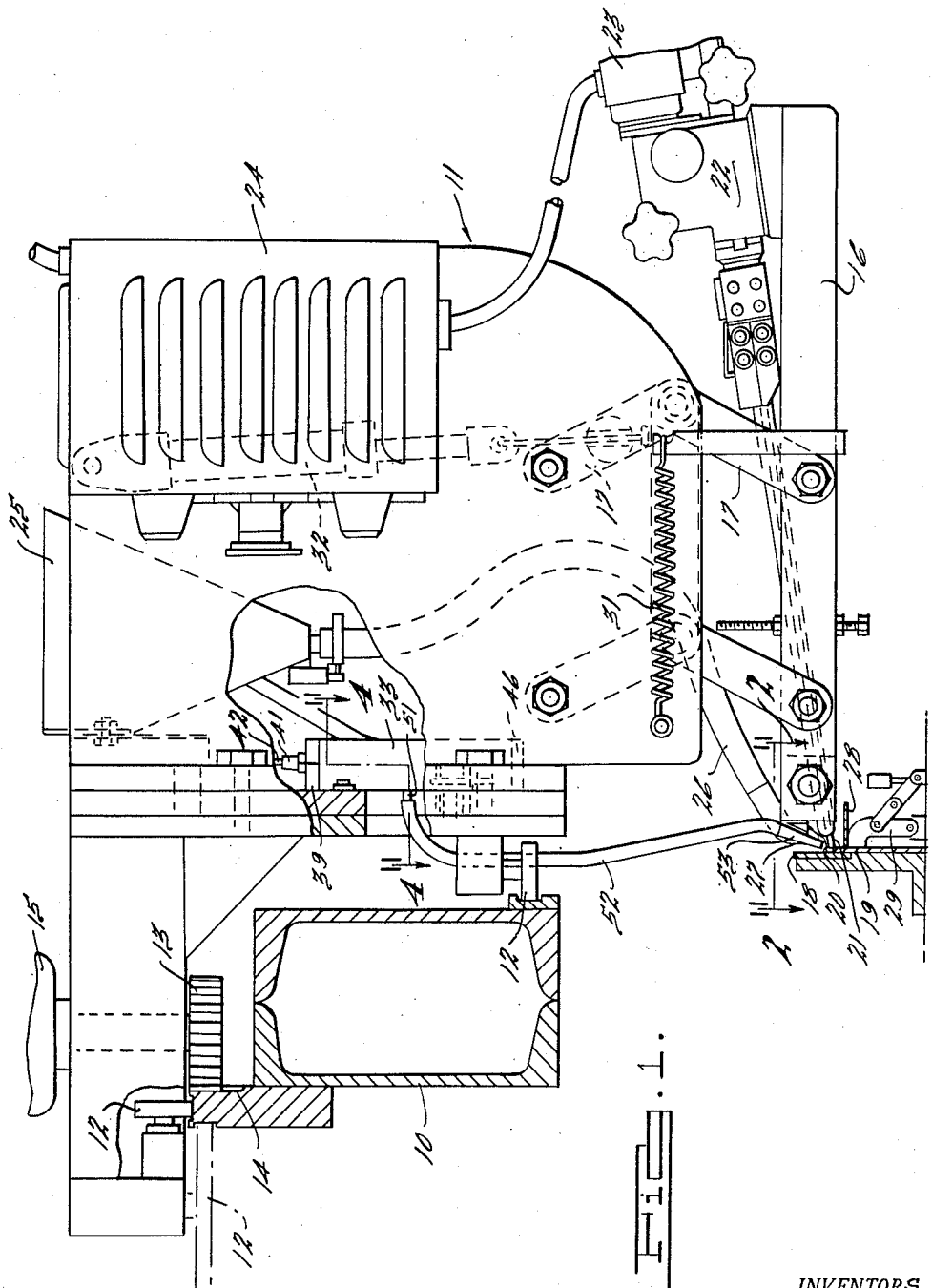
INVENTORS.
Eugene E. Rhodes.
Harry G. Scholtz.
BY
Harness, Dickey & Pierce.
ATTORNEYS.

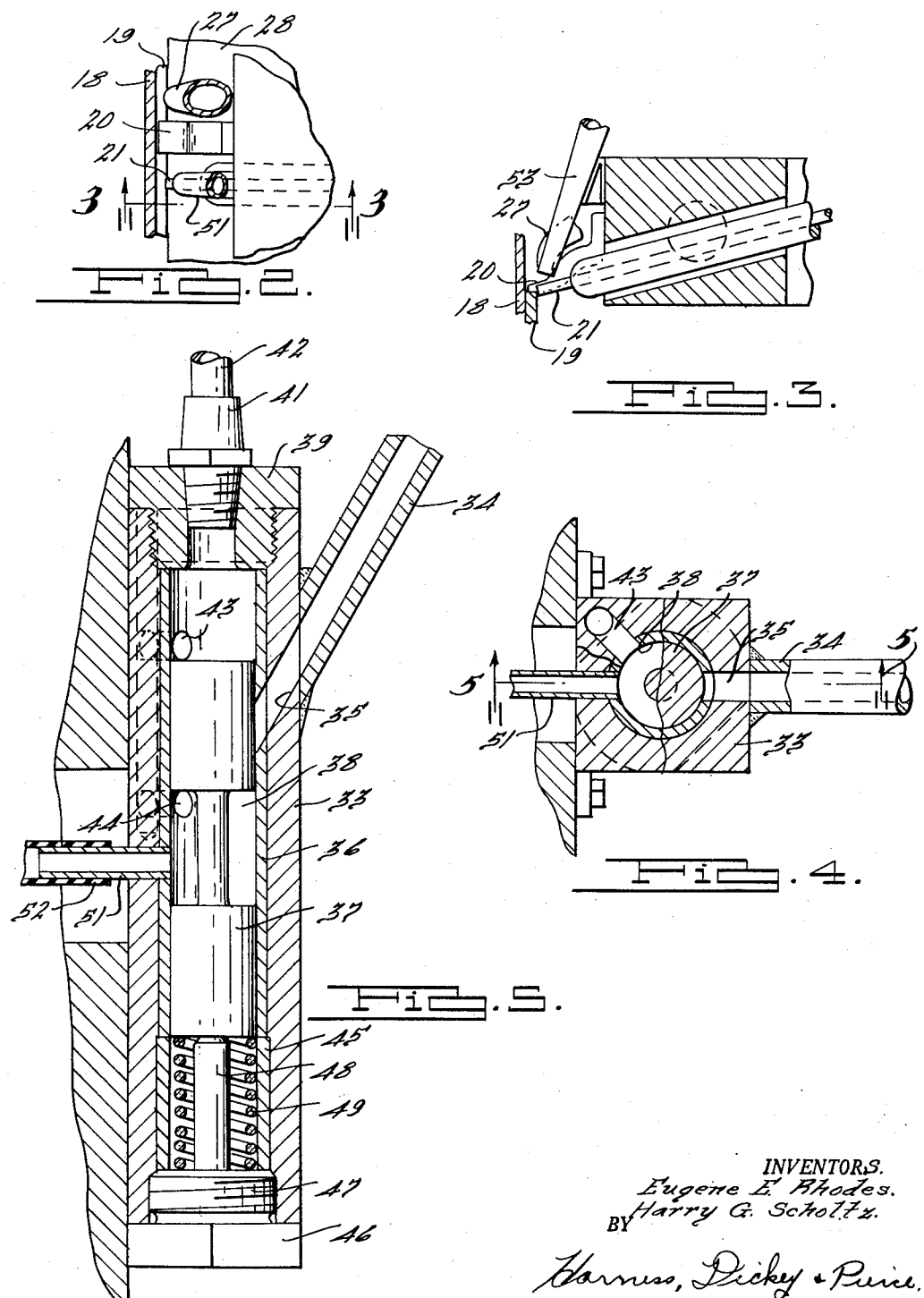

/ Patented July 28, 1953

2,646,649

UNITED STATES PATENT OFFICE 2,646,649

STRUCTURE AND METHOD FOR CLEANING WELDING RODS

Eugene E. Rhodes, Dearborn, and Harry G. Scholtz, Wyandotte, Mich., assignors to The Murray Corporation of America, Detroit, Mich., a corporation of Delaware Application February 4, 1952, Serial No. 269,862

5 Claims. (Cl. 51—8)

1

This invention relates to structure and method of cleaning welding rods, and particularly to a structure and a method for removing hardened flux from the end of a welding rod prior to its application to metal to be welded.

When automatically welding pieces of metal by an immersed arc, that is to say, by a fed wire having its ends concealed in granules of flux, difficulty was found to occur due to the adhesion of the flux granules to the end of the welding rod after the welding operation. Upon the beginning of the succeeding welding operation, the arc usually failed to strike due to the presence of the hardened flux granules on the rod end, which prevented a current passing therethrough to the metal to be welded and which thereby prevented an arc from being struck. Various devices and methods were tried to prevent the adhesion of the flux to the rod and also for removing the flux therefrom, but none appeared satisfactory until the device and method of the present invention were developed.

This embodies the blowing of a predetermined amount of flux granules directly onto the accumulated flux on the end of the rod before the beginning of the welding operation, to thereby have the granules blast the adhered flux from the rod end. The device embodies a cylinder having a piston therein which is moved by fluid pressure in one direction and in the opposite direction by a sprink. The piston has a recess in the central part and a conduit connects the cylinder to the flux supply hopper, which thereby meters a predetermined amount of flux granules to the recess of the piston when the piston is in retracted position. When air is supplied to the upper end of the piston, the piston is moved downwardly, compressing the spring, cutting off the supply of flux granules, and opening a passageway from above the piston to the recessed portion thereof so that the air above the piston passes into the recessed portion and forces the granules therefrom through a conduit which directs the granules on the hardened flux at the end of the rod. A sufficient quantity of the granules is supplied under predetermined pressure to produce a blasting of the adhered flux from the rod end so that the rod end is always clean upon the initiation of a subsequent welding operation.

Accordingly, the main objects of the invention are: to provide a device and method by which the adhered flux on the end of the welding rod is blasted therefrom; to provide a cylinder having a piston therein, with a recessed area into which a predetermined amount of flux granules

2 is delivered at the end of the retracted stroke of the piston, which supply is cut off therefrom when the piston is moved downwardly to delivering position, which delivery is effected by the air which is by-passed from the top of the piston to the recessed portion thereof; to provide a device for metering a predetermined amount of granules which are forced by air against the accumulated flux on the end of the rod for blasting the flux therefrom, and, in general, to provide a device and method for blasting accumulated flux from the end of a welding rod which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken view, in elevation, of a portion of a welding machine having a device thereon for blasting the accumulated flux from the end of the welding rod thereof;

Fig. 2 is an enlarged, broken sectional view of the structure illustrated in Fig. 1, taken on the line 2—2 thereof;

Fig. 3 is a sectional view of the structure illustrated in Fig. 2, taken on the line 3—3 thereof;

Fig. 4 is an enlarged, sectional view of the structure illustrated in Fig. 1, taken on the line 4—4 thereof, and Fig. 5 is a sectional view of the structure illustrated in Fig. 4, taken on the line 5—5 thereof.

In Fig. 1 a portion of welding device is illustrated, similar to that described and claimed in the copending application of Werner G. Hess, Serial No. 204,864, filed January 8, 1951, which was assigned to the assignee of the present invention. This device embodies a carrying rail 10 on which a welding device 11 is mounted for movement therealong. The device is supported by suitable rollers 12 thereon and is driven by a pinion gear 13 engaging teeth in a track 14 by a motor 15. The welding device embodies a swingable arm 16 mounted on parallel arms 17 which control the movement of the arm 16 to cause it to swing forwardly against the face of a workpiece 18 and downwardly thereafter to have a guide finger 20 engage the top of a workpiece 19 which is to be welded to the workpiece 18. The guide finger 20 follows the joint between the two workpieces upwardly and downwardly and forwardly or outwardly so as to maintain the welding rod 21 in predetermined relation to the joint to be welded. The welding rod has a feeding mechanism 22 of conventional form, the motor 23 of which is operated from a suitable control mechanism 24. A welding flux is contained in the hopper 25 and delivered therefrom through a tube 26 to the delivering nozzle 27. The flux is piled up over the joint to be welded on the platform 28 which may be retained in supporting position in any manner, herein illustrated as by being fastened to the work clamping elements 29. Counterbalancing springs 31 cause the arm 16 to swing to the left, while the cylinder 32 produces the retraction of the arm 16 after a welding operation.

A flux measuring and delivering cylinder 33 is secured to the welding mechanism, having a conduit 34 connected to the flux containing hopper 25. A passageway 35 through the cylinder wall delivers the flux at a predetermined point in the cylinder wall, for a purpose which will be explained hereinafter. The cylinder 33, as illustrated in Figs. 4 and 5, has a sleeve 36 in which a piston 37 operates. The piston has a central area 38 which forms a recess for the reception of the flux. When the piston is in raised or retracted position, the area 38 is then aligned with the end of the aperture 35 in the cylinder and sleeve wall. A header 39 is threaded in the end of the cylinder 33, having a central aperture in which a fitting 41 is provided connected to an air line 42. A by-pass passageway 43 for air extends through the sleeve 36 into the cylinder wall 33, and when the cylinder is in its lowermost position delivers air from above the piston through an outlet passageway 44 in the recessed area 38 medially of the piston ends.

A sleeve 45 abuts the sleeve 36 and the sleeve is retained in aligned position by a bottom plug 46 having a threaded portion 47 which is screwed into the cylinder 33. A central stem 48 limits the downward movement of the piston 37, while a spring 49 thereabout forces the piston to its initial upward or retracted position when the air pressure is removed from the line 42. A delivering conduit 51 extends through the sleeve 36 and wall of the cylinder 33 in the area 38 of the piston when the piston is in its lowermost position for delivering flux granules to a flexible conduit 52 and a nozzle 53 which is located directly adjacent to the end of the welding rod 21.

In operation, when the air is removed from the line 42, the piston 37 is in its uppermost retracted position, having the passageway 35 through the cylinder 33 and sleeve 36 uncovered so that flux granules may pass into the area 38 between the piston ends. After the machine has been operated to move the parts into the position for welding just prior to the application of electric energy to the welding rod, an air valve is operated to admit air to the line 42 to force the piston downwardly to the position illustrated in Fig. 5, whereupon the flux granules in the area 38 are carried opposite to the delivering conduit 51 and the further delivering of the granules is prevented when the upper portion of the piston moves downwardly over the passageway 35. Near the end of the downward movement of the piston, air from above the piston passes into the passageway 43 and out of the passageway 44 into the recessed area 38 between the piston ends, which air forces the flux granules from the area out of the passageway 51 through the flexible conduit 52 and out of the delivering nozzle 53 onto the end of the rod 21. The force of the flux granules blasts the accumulated flux from the end of the rod, to thereby clean the rod and make sure that an arc will be struck as soon as the current is applied to the welding rod. By cleaning the flux from the rod in this manner, electric contact is established between the rod and the part to be welded at all times so that an arc will immediately strike upon the application of current to the rod. Heretofore, the rod moved some distance over the area to be welded before the flux broke therefrom and before an arc could be struck, thereby forming a defective weld. By the use of the blasting method above defined through the use of the measuring cylinder, the flux is removed from the end of the rod before the welding machine is moved, so that when the arc is struck when the welding machine moves along the rail 10, a weld will be initially made and maintained throughout the length of movement of the machine. By waiting until just before the time for a weld to occur before attempting to remove the flux particles, it was found that the flux particles cooled enough to become brittle so that they could readily be blasted from the rod end by the impinging flux particles. By the use of the flux particles, no loss of material occurs, nor are the flux particles remaining around the weld lost or diluted by other materials, since all of the particles are being constantly salvaged and returned to the hopper 25.

What is claimed is:

1. The method of cleaning collected flux from the end of a welding rod which includes the steps, of moving the rod to an initial point for welding so as to permit the cooling of the flux on the rod end, of measuring a predetermined amount of flux, and of employing a blast of air for carrying said predetermined amount of flux to the end of the rod for blasting the adhered flux therefrom.

2. In a device for removing adhered flux from the end of a welding rod, a cylinder, a piston in said cylinder having a recessed central portion, a supply conduit to said cylinder communicating with said recessed portion when the piston is in retracted position, means for retracting said piston, a conduit connected to the opposite end of the cylinder for delivering air to the opposite end of the piston from that containing the retracting means, said cylinder having a by-pass passageway extending from the top end to the recessed portion of the piston when the piston is in delivering position, and a delivering conduit on said cylinder from which the flux granules in the recessed area of the piston are forced by the by-passed air from the top of the piston when the piston is near the end of its stroke to delivering position.

3. In a device for removing adhered flux from the end of a welding rod, a cylinder, a piston in said cylinder having a recessed central portion, a supply conduit to said cylinder communicating with said recessed portion when the piston is in retracted position, means for retracting said piston, a conduit connected to the opposite end of the cylinder for delivering air to the opposite end of the piston from that containing the retracting means, said cylinder having a by-pass passageway extending from the top end to the recessed portion of the piston when the piston is in delivering position, and a delivering conduit on said cylinder from which the flux granules in the recessed area of the piston are forced by the by-passed air from the top of the piston when the piston is near the end of its stroke to delivering position, said piston cutting off the supply of flux granules when in delivering position.

4. In a device for blasting flux from the end of a welding rod including a cylinder having a supply of air delivered to one end thereof, a piston within the cylinder, a spring within the cylinder engaging the end of the piston opposite to that to which air is supplied, a supply conduit in the wall of the cylinder connectable to a hopper containing flux granules, the piston interjacent its ends having a recessed portion for receiving a predetermined amount of flux from said delivery conduit when moved to one position by said spring, the supply conduit being cut off when the piston is moved to compress the spring, and a delivery conduit through the cylinder wall communicating with the recessed area of the piston when the piston has been moved by air pressure to compress the spring, said cylinder having a by-pass passageway connecting the area above the piston to the recessed area thereof when the piston is in spring compressed position for forcing the measured amount of flux granules from the recessed area through the delivery conduit for blasting the adhered flux from the welding rod.

5. In a device for cleaning an article, a cylinder, a piston in said cylinder having a recessed central portion, a supply means for cutting granules communicating through the cylinder with said recessed portion when the piston is in retracted position and cut off therefrom when in advanced position, means for retracting said piston, a fluid supply conduit connected to the end of the cylinder containing the retracted piston, said cylinder having a by-pass passageway extending from the top end of the piston to the recessed portion thereof when the piston is in advanced position, and a delivery conduit on said cylinder communicating with the recessed portion of the piston when the piston is in advanced position.

EUGENE E. RHODES.
HARRY G. SCHOLTZ.

References Cited in the file of this patent

UNITED STATES PATENTS

| Number | Name | Date |
| --- | --- | --- |
| 1,230,654 | Berry | June 19, 1917 |
| 2,328,581 | Quinn | Sept. 7, 1943 |